United States Patent
Stopczynski et al.

(10) Patent No.: US 6,420,996 B1
(45) Date of Patent: Jul. 16, 2002

(54) INTEGRATED RADAR AND ACTIVE TRANSPONDER COLLISION PREDICTION SYSTEM

(75) Inventors: Lawrence Gerard Stopczynski, Milford; Steven Yellin Schondorf, Dearborn; Scott Howard Gaboury, Ann Arbor; J. B. Drummond, Jr., Southfield, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,224

(22) Filed: Aug. 8, 2001

(51) Int. Cl.[7] ............................................. G01S 13/93
(52) U.S. Cl. .................... 342/70; 342/71; 342/72; 342/42; 342/82; 342/107; 342/113; 342/114; 342/125; 342/146; 701/301; 701/45; 701/96; 340/435; 340/436
(58) Field of Search ........................... 342/70, 71, 72, 342/42, 44, 51, 82, 83, 84, 85, 86, 87, 90, 107, 109, 113–115, 125, 133, 139, 146, 147, 157, 158; 701/301, 45, 96; 340/435, 436

(56) References Cited

U.S. PATENT DOCUMENTS

| | | | | |
|---|---|---|---|---|
| 4,003,049 A | * | 1/1977 | Sterzer et al. ................. | 342/43 |
| 4,011,563 A | * | 3/1977 | Robbi ......................... | 342/128 |
| 4,109,247 A | * | 8/1978 | Kaplan ........................ | 342/50 |
| 4,203,113 A | * | 5/1980 | Baghdady .................... | 342/71 |
| 5,070,334 A | | 12/1991 | Commissaire et al. ........ | 342/43 |
| 5,424,747 A | * | 6/1995 | Chazelas et al. .............. | 342/70 |
| 5,506,584 A | | 4/1996 | Boles .......................... | 342/42 |
| 5,589,827 A | | 12/1996 | Scurati ....................... | 340/901 |

* cited by examiner

Primary Examiner—John B. Sotomayor
(74) Attorney, Agent, or Firm—Gary A. Smith

(57) ABSTRACT

A method and apparatus for permitting a host automotive vehicle to avoid or mitigate the consequences of a collision between the host vehicle and a target automotive vehicle by using a combination of radar derived target information and transponder information. The host vehicle is equipped with a radar system operative detect the target vehicle and generate target data, and a computer which determines a likelihood of collision with target vehicle. If the likelihood of collision is above a certain level, the computer directs the radar system to transmit a directional interrogation system toward the target vehicle. The target vehicle is equipped with one or more transponders that receive the interrogation signal and respond by transmitting a response signal containing information indicating various dynamic and/or static characteristics of the target vehicle. The response signal is received by the host vehicle and is decoded to extract the target vehicle information. The computer then uses the transponder-derived target information along with the radar-derived target information to accurately determine the nature of the impending collision and direct appropriate changes in performance of one or more systems of the host vehicle in order to avoid or mitigate the consequences of the collision.

17 Claims, 5 Drawing Sheets

INTEGRATED RADAR AND ACTIVE TRANSPONDER COLLISION PREDICTION SYSTEM

BACKGROUND OF THE INVENTION

This invention relates to automotive vehicle radar systems for detecting the presence of other vehicles in the vicinity and evaluating the possibility of a collision between the vehicles.

Currently there is great interest in developing systems that will allow an automotive vehicle to sense or detect other vehicles in its vicinity and determine whether a collision between the vehicles is likely. A vehicle-mounted radar system may be used to collect information about other vehicles or objects (generally known as targets) in the radar's field-of-view and provide processed tracking information to other vehicle systems. When a collision between the vehicle and a target is likely or imminent, various actions can be taken to attempt to avoid the collision entirely or to mitigate the consequences of the collision. For example, automatic braking may be used to avoid the collision or to decrease the relative velocity of the collision. It is also possible to activate occupant protection devices on board the vehicle, such as airbags or seatbelt pretensioners.

One limitation associated with target tracking data available from a radar system is that it is often unable to reliably and/or accurately identify features of the target such as its size, mass, center of mass location, and/or structural information. Such target information may be useful in determining the optimum vehicle response to a possible or impending collision with the target.

It may be difficult for a conventional radar system to obtain highly accurate positional and dynamic information on the target vehicle. The total radar return of a target vehicle is a composite made up of separate and discrete reflections from many different parts of the vehicle, such as the grille, side view mirrors, door panels, etc. These parts are generally at different orientations to the radar antenna at any given time and have differing reflectivities. Accordingly, as the target vehicle moves relative to the radar-equipped vehicle, the total radar cross-section of the target changes and the apparent position of the target's centroid changes. The resulting variations in the target's radar return may make it difficult to track the target vehicle with the degree of accuracy required for crash avoidance/mitigation purposes.

It has been proposed to equip vehicles with passive transponders that continually emit radio signals carrying information (in digital or other coded form) describing static and/or dynamic characteristics of the vehicles. Each vehicle is also equipped with a compatible receiver system for receiving and decoding the transponder transmissions from other vehicles. This allows all properly equipped vehicles to "know" pertinent information about the other vehicles in the driving environment.

Driving environments, however, commonly involve dozens of vehicles in relatively close proximity to one another. If all vehicles are equipped with passive transponders, any single vehicle will be receiving the transponder signals from all of the other vehicles in its environment. A vehicle must therefore be able to decode all of the received signals, extract the target information, and match the target information with the correct target vehicle identity and location. The vehicle must therefore process a great deal of information in order to yield results that may be used to take collision avoidance/mitigation actions. Such processing may make the system slower than is desirable in a dynamic driving environment.

SUMMARY OF INVENTION

The present invention is directed to a method and apparatus for permitting a host automotive vehicle to avoid or mitigate the consequences of a collision between the host vehicle and a target automotive vehicle by using a combination of radar derived target information and transponder information.

The host vehicle is equipped with a radar system operative to scan a sector of the host vehicle's environment, detect the target vehicle and generate target data such as the range, relative bearing, relative velocity, and relative acceleration of the target vehicle.

The host vehicle is further equipped with a computer which utilizes the radar target data to determine a likelihood of collision between the host vehicle and target vehicle. If the likelihood of collision is, above a certain level, the computer directs the radar system to transmit a directional interrogation system toward the target vehicle. The target vehicle is equipped with one or more transponders that receive the interrogation signal and respond by transmitting a response signal containing information indicating various dynamic and/or static characteristics of the target vehicle. The response signal is received by the host vehicle and is decoded to extract the target vehicle information. The computer then uses the transponder-derived target information along with the radar-derived target information to accurately determine appropriate changes in performance of one or more systems of the host vehicle in order to avoid or mitigate the consequences of the collision.

According to another aspect of the invention, the radar system comprises an electronically scanned antenna capable of transmitting both the scanning radar signal for detecting the target and the directional interrogation signal. The electronically scanned antenna is well adapted to the dual purpose, and is able to generate a relatively narrow beam of RF energy as is desirable for the interrogation signal.

According to another aspect of the invention, the target vehicle is equipped with at least two transponders that transmit distinct response signals. The computer on the host vehicle is able to distinguish between the two response signals and is thereby able to determine an orientation of the target vehicle relative to the host vehicle. This orientation may be determined by comparing one or more characteristics of the two transmitter response signals such as time of arrival, angle of arrival, or phase shift.

According to another aspect of the invention, the information contained in the response signal indicates a relative bearing of the host vehicle with respect to the target vehicle. In an embodiment disclosed herein, this is achieved by transmitting a response signal comprising a reference phase signal radiating in all directions from the target vehicle, and a variable phase signal rotating through 360 degrees. The reference phase signal and the variable phase signal are in phase when the variable phase signal passes a reference bearing of the target vehicle (preferable a bearing of 0 degrees or dead ahead), and at all other bearings the two signals are out of phase by an amount equal to an angle between the bearing of the variable phase signal and the reference bearing. Thus, the host vehicle can determine its bearing relative to the target vehicle by calculating the phase difference between the two signals.

According to still another feature of the invention, the radar system antenna comprises at least two separate antennas mounted at different positions on the host vehicle, whereby differences in the response signal as received at the two antennas allows the computer to determine the orientation of the target vehicle relative to the host vehicle.

DETAILED DESCRIPTION OF THE INVENTION

Figure 1:
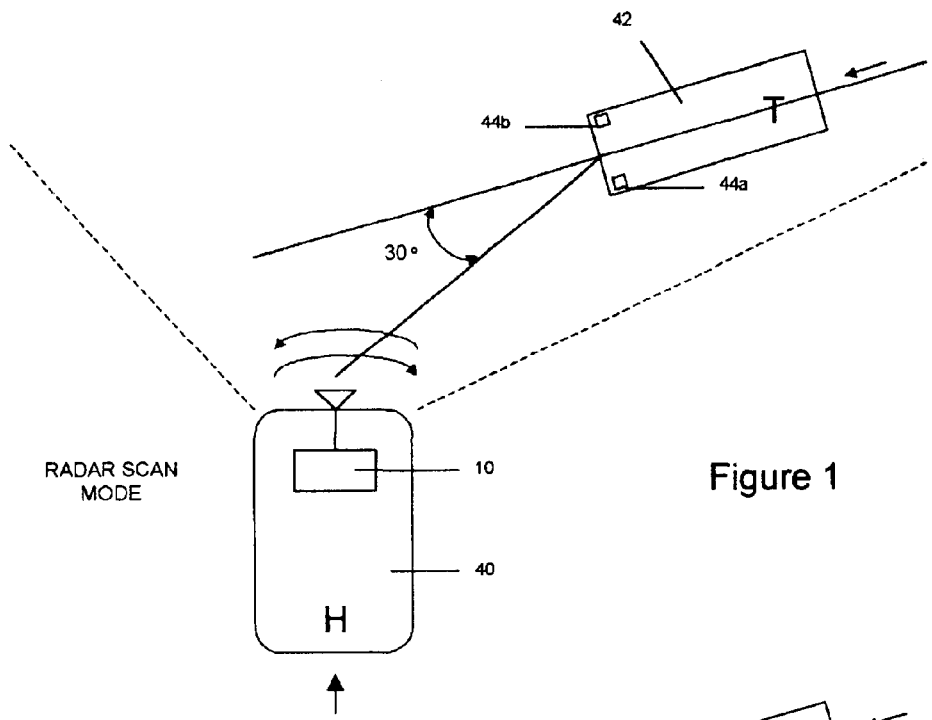
FIG. 1 is a diagrammatic view of a radar/transponder system according to the present invention on a host vehicle in scan mode to detect a target vehicle.

FIG. 1 depicts a host vehicle 40 equipped with an integrated radar/transponder system 10 in accordance with the present invention, and a target vehicle 42 equipped with one or more transponders 44a, 44b compatible with the invention system. The radar/transponder system 10 initially operates in a conventional radar mode, scanning a sector of the host vehicle's environment to detect targets. Upon detecting the target vehicle 42, the system 10 generates target data such as the range, relative bearing, relative velocity, and relative acceleration of the target vehicle.

The radar/transponder system 10 further includes a computer that utilizes the radar target data to determine a likelihood of collision between the host vehicle 40 and target vehicle 42. As discussed in further detail below, the computer may consider inputs from a number of other systems of the host vehicle 40 in order to accurately determine the likelihood of collision. If the likelihood of collision is above a certain level, the computer directs the radar system to transmit a directional interrogation signal 46 toward the target vehicle 42. See FIG. 2.

Figure 3:
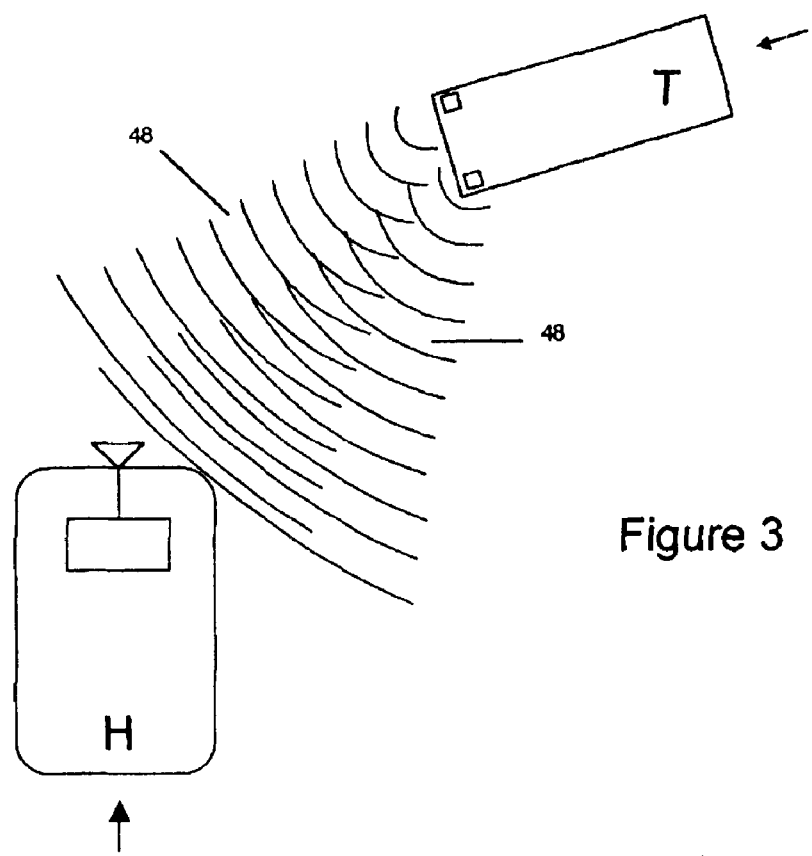
FIG. 3 is a diagrammatic view of a transponder response signal being transmitted from the target vehicle and received by the host vehicle.

The target vehicle 42 is equipped with one or more active transponders 44a,44b operative to transmit a response signal 48 (see FIG. 3) when triggered by receipt of the interrogation signal 46 from the host vehicle 40. The transponders 44a,44b are triggered only by the interrogation signal 46, and not by the RF signal transmitted during the normal scan mode of the radar system. The response signal 48 is an RF signal containing a variety of information describing the static and/or dynamic state of the target vehicle 42. The information is preferably carried by the signal in a digital format. In FIG. 3, the response signals 48 are depicted as being directed toward the host vehicle 40 for clarity only: the response signals may be directional, but are preferably omnidirectional.

The response signal(s) 48 are received by the radar/transponder system 10 and are decoded to extract the target vehicle information. The radar/transponder system's computer then uses the transponder-derived target information along with the radar-derived target information to determine the nature of the impending collision and direct appropriate changes in performance of one or more host vehicle systems in order to avoid or mitigate the consequences of the collision.

Figure 4:
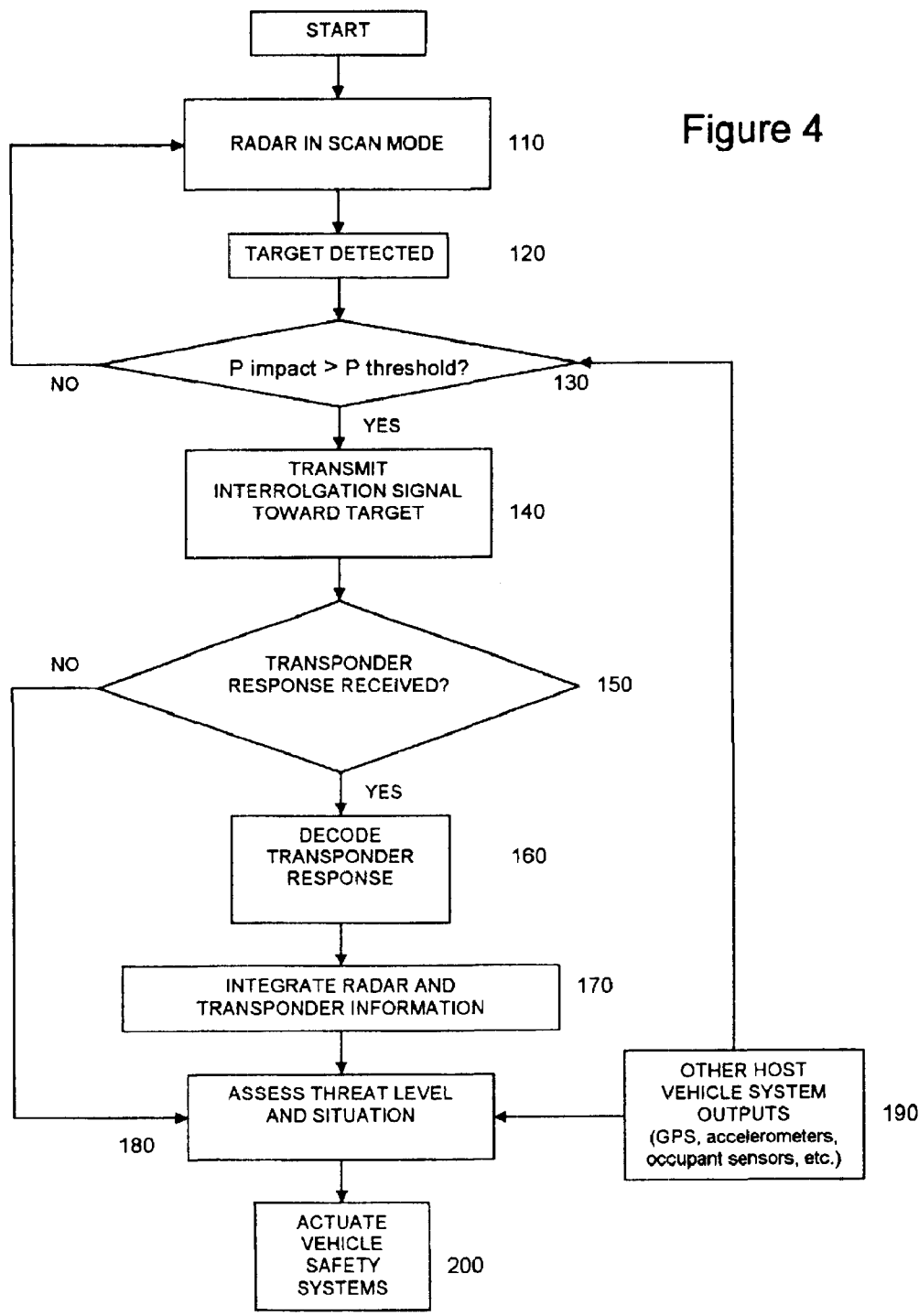
FIG. 4 is a flow chart showing the sequence of operation of the system according to the present invention.

The flowchart of FIG. 4 depicts an overall theory and sequence of operation of the invention system. The invention radar system initially operates in a scan mode (block 110) wherein the radar on host vehicle 40 scans a sector generally in front of the vehicle and as wide as is practical. The host vehicle radar system 10 may include multiple antennas (not shown) oriented to the sides and/or rear of the vehicle to increase the azimuth coverage of the system. The antenna(s) may be mechanically scanned, or may be an electronically scanned antenna such as a phased array antenna.

When the radar system 10 detects a target vehicle (block 120), the system generates track information such as the relative location, velocity, and acceleration of the target. The track information is used along with inputs from other vehicle systems (such as a GPS receiver and vehicle dynamics sensors) to calculate the probability that the target vehicle 42 and host vehicle 40 will collide. If the probability of collision $P_{Impact}$ is above a certain threshold level $P_{Threshold}$ (block 130), an interrogation signal is generated and transmitted toward the target vehicle 42. See block 140 and FIG. 2.

The interrogation signal 46 is preferably a highly directional signal transmitted directly toward the target vehicle 42 in as narrow a beam as is feasible. This directional interrogation signal 46 may be provided by means of an electronic beam shaping system or by a mechanically scanned antenna. A highly directional interrogation signal is preferable so that the signal is received only by the transponder (s) on board the target vehicle 42 and not transponders mounted on other vehicles in the vicinity that are of lesser interest at the particular time. This limits or eliminates the reception by radar/transponder system 10 of transponder responses from other vehicles in the vicinity, and thereby minimizes the number of signals that must be processed by the system. Processing of unnecessary signals from non-pertinent vehicles may result in saturation of the system and/or undesirably long processing time.

The host vehicle may or may not receive a transponder response signal, depending on whether the target vehicle is equipped with an active transponder compatible with the system. If a transponder response is received (block 150), the host vehicle's system decodes the response to extract the target vehicle information from the signal (block 160). The radar/transponder system 10 then integrates the radar-derived target vehicle information with the information carried by the transponder response signal (block 170) and uses this combination of information to assess the overall situation and the level of threat of a collision (180).

Other host vehicle systems may also provide inputs to the system for inclusion in the algorithm(s) used to make threat assessments and decisions (block 190). Examples of such vehicle systems include an occupant position and/or classification sensing system, seat belt status sensors, vehicle dynamics sensors such as accelerometers, steering wheel position sensor, etc. The system preferably utilizes a neural network and/or fuzzy logic algorithm(s) to evaluate the probability of collision and other factors influencing the threat situation and determine what changes to the performance of host vehicle systems should be made in order to avoid or mitigate the consequences of the collision. See block 200.

Among the possible changes in operation of vehicle systems that may be directed by the system are: activating a device to alert the driver of the host vehicle to a possible collision; pre-arming and/or activating occupant restraint systems such as airbags, seatbelt pre-tensioners, deployable head-rests, and deployable knee bolsters; activating a brake booster or an automatic braking system; pre-arming and/or inflating an external airbag; and altering the height of the vehicle bumper to improve the geometric compatibility between the host and target vehicles during a collision.

It is possible that no transponder response signal will be received from the target vehicle 42. This may be because the target vehicle 42 is not equipped with the proper transponder equipment, or because of some system malfunction in one or both of the vehicles. If no response signal is received, the system skips from block 150 to block 180, and is forced to assess the threat level and situation without the response signal information. In this case, the threat assessment algorithm preferably takes into account the generally lower accuracy and/or reliability of the radar information as compared with integrated radar/transponder information.

Figure 5:
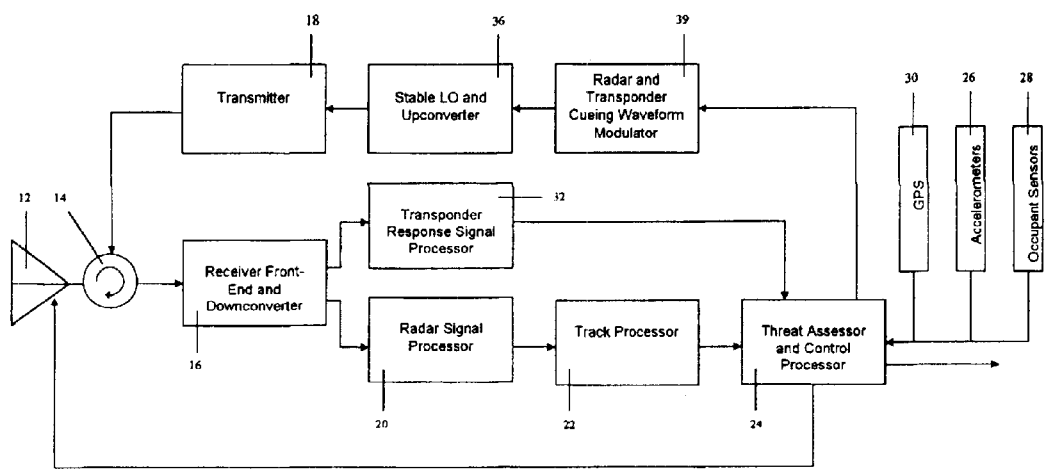
FIG. 5 is a block diagram of an integrated radar/transponder system according to the present invention.

FIG. 5 schematically depicts an integrated radar/transponder system 10 operative in accordance with the present invention. The system comprises a radio frequency antenna 12 and a duplexer 14 for allowing the antenna to be utilized with both a transmitter 18 and a receiver front-end/down-converter 16, as is well known in the radar field. The transmitter 18 and receiver 16 may operate in any appropriate frequency range, and in the preferred embodiment operate at approximately 76 GHz as is currently allowed by government regulations.

The output of the receiver front-end 16 is passed to a radar signal processor 20 that performs various algorithms and passes its output to a track processor 22. The track processor 22 extracts individual target tracks of any moving and/or stationary object within the radar's field of view and range, and passes these tracks along to a threat assessor and control processor (TACP) 24. The TACP 24 receives other inputs from vehicle systems such as accelerometers 26, vehicle occupant sensors 28, and a global positioning system (GPS) receiver 30.

The TACP 24 utilizes the available input signals to continually determine a probability that any particular target vehicle 42 detected by the radar system will collide with the host vehicle. Various threat assessment algorithms for making this collision probability determination are known in the art and are beyond the scope of the present invention. Among these algorithms are those utilizing fuzzy logic and neural networks.

A transponder response signal processor (TRSP) 32 is also disposed between receiver front-end/down-converter 16 and TACP 24, in parallel with the radar signal processor 20 and track processor 22. When the response signal 48 from the target vehicle 42 is received through antenna 12 and receiver front-end/down-converter 16, the TRSP 32 extracts information carried by the transponder response signal and passes this information to the TACP 24. In TACP 24, the transponder information extracted from the response signal is integrated with the target information derived from the reflected radar signal, greatly increasing the accuracy and robustness of the threat assessment made by the TACP 24.

Although the TRSP 32 is shown separate from the radar signal processor 20, the two functionalities may be combined in a signal-processing device operative to process the transponder and radar signals separately and in parallel.

TACP 24 also provides control to a radar and transponder cueing waveform modulator (RTCWM) 34. RTCWM 34 is connected with a stable oscillator/up-converter 36 to generate signals that are passed to the transmitter 18 for transmission through the antenna 12. The TACP 24 is also operative to control the RF antenna 12 in order to steer the radar beam as necessary to achieve a desired scan pattern and/or beam width.

Figure 6:
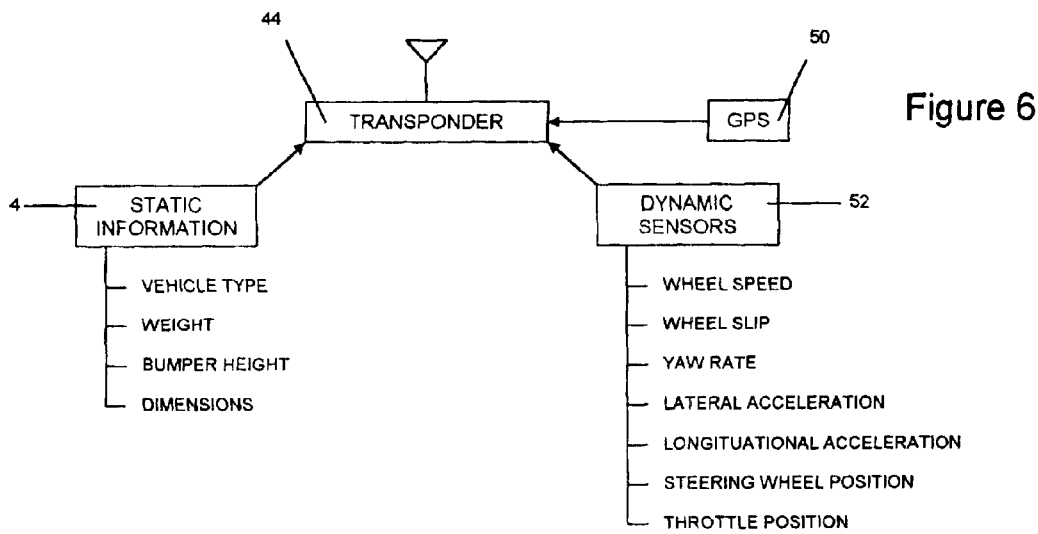
FIG. 6 is block diagram showing a transponder system on board the target vehicle according to the present invention.

FIG. 6 depicts the overall architecture of an active transponder 44 according to the present invention. The transponder is provided with information by various systems on board the target vehicle, such as a GPS receiver 50, vehicle dynamics sensors 52, and a static information storage unit 54. The GPS 50 (or a similar satellite-based or ground-based navigation system) provides vehicle location coordinates, velocity, and/or acceleration. The vehicle dynamics sensors 52 may include, for example, wheel slip and/or wheel speed sensors, one or more accelerometers, a steering wheel position sensor, and a throttle position sensor.

The static information storage unit 54 contains physical properties of the vehicle such as vehicle weight, bumper height, and/or physical dimensions of the target vehicle 42. The information from the GPS 50, vehicle dynamics sensors 52, and static information storage unit 54 are passed to the transponder unit 44, which creates and transmits a response signal containing the target vehicle information, preferably in an encoded digital form.

The host vehicle 40 is also preferably equipped with an active transponder capable of communicating with the interrogation systems carried on any other properly equipped vehicle, but this equipment is not shown in the figures for purposes of clarity.

Figure 2:
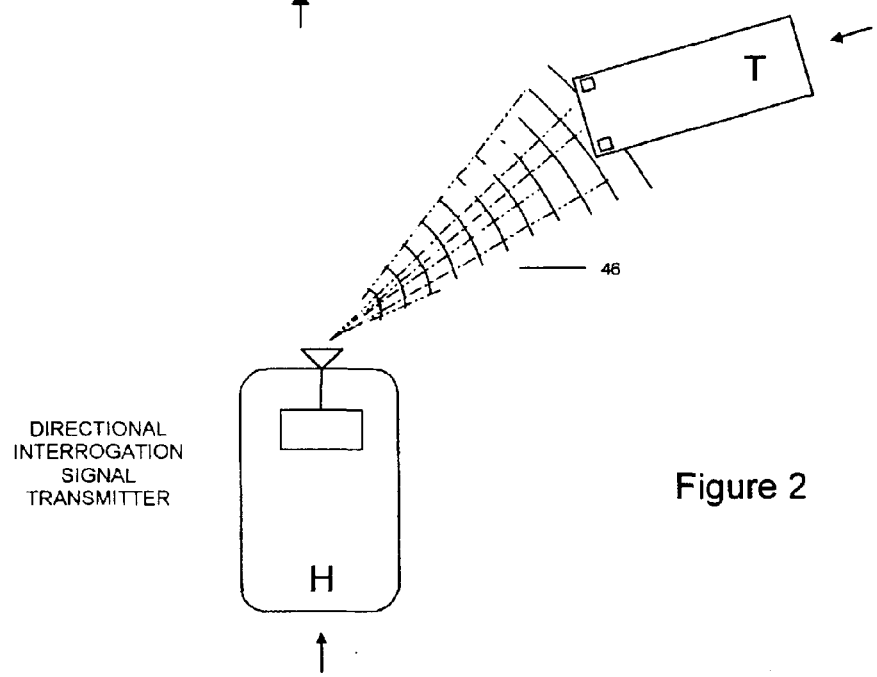
FIG. 2 is a diagrammatic view of the host vehicle transmitting a directional interrogation signal towards the target vehicle.

As depicted in FIGS. 1–3, the target vehicle 42 may be equipped with two separate transponder units 44a,44b that transmit distinct, differently coded response signals. The transponder 44a located on the left side of the vehicle transmits a signal with identifies it as the "left hand" transponder, and the second transponder 44b on the right side of the vehicle transmits a signal with identifies it as the "right hand" transponder. When the host vehicle 40 receives the two distinct transponder responses, it may be able to tell the orientation of the target vehicle 42 relative to the host vehicle 40. This may be accomplished, for example, by comparing the time of arrival, angle of arrival, and/or phase difference of the two response signals.

Some of the static and/or dynamic target vehicle 42 information contained in the transponder response signal cannot possibly be detected by a conventional radar system alone. Among these characteristics are wheel slip, steering wheel position, vehicle weight, bumper height, and precise vehicle dimensions.

Other target vehicle information, while detectable by the radar, can be determined with greater accuracy by the target vehicle's on-board sensors and transmitted to the host vehicle in the transponder response signal. Examples are target vehicle dynamic information such as location, velocity, and acceleration as detected by the target vehicle's accelerometers and/or GPS receiver. The dynamic information carried by the transponder response signal may be more accurate than that available from the "skin paint" obtained from the radar signal. Because the reflected radar returned from the target vehicle 42 is by necessity a composition of multiple reflected surfaces on a target vehicle 42, ambiguities may be present even when using sophisticated processing radar techniques. Such ambiguities may be resolved by using the dynamic information contained in the transponder response signal, such as lateral or longitudinal acceleration or yaw rate. The overall accuracy and robustness of the system's evaluations is therefore improved by combining or integrating the radar-derived information with the information contained in the transponder response signal, which is potentially more accurate.

It should be noted that the radar system 10 does not cease scanning the environment for additional targets after a target vehicle 42 is first detected. Rather, the radar system 10 is continuously looking for new targets and updating the track information on the target vehicle 42 while the processing and evaluation steps of FIG. 4 (blocks 130 through 200) are accomplished.

In a possible embodiment of the invention, the transponder response signal contains information which, when received and decoded by the host vehicle 40, indicates a relative orientation of the target vehicle 42 with respect to the host vehicle 40 prior to and at the time of impact. This may be achieved by the target vehicle 42 transmitting a response signal composed of two distinct, omnidirectional sub-signals which are out-of-phase with one another by an amount equal to the direction in which the signals emanate from the target vehicle 42.

This dual-signal phase difference method is the basic theory of operation for the VOR (VHF omni-range) navigation radio navigation used in general aviation. A first or reference phase signal radiates in all directions. A second, variable-phase signal, rotates through 360 degrees in a clockwise direction, like the beam from a lighthouse. Both signals are in phase when the variable signal passes 360 degrees (referenced to straight ahead of the target vehicle 42) and they are 180 degrees out of phase when the rotating signal passes 180 degrees (straight behind the target vehicle 42).

If the signals received by the host vehicle 40 are 330 degrees out of phase, it indicates that the host vehicle 40 lies along a line-of-position extending 30 degrees to the left of straight ahead of the target vehicle 42 (see FIG. 1). When this information is combined with the range and bearing of the target vehicle 42 relative to the host vehicle 40 as detected by the host vehicle radar system, the relative positions and orientations of the two vehicles is completely described.

It is also possible to improve the ability of the host vehicle 40 to detect the bearing and/or orientation of the target vehicle 42 by equipping the host vehicle 40 with multiple, separate receive antennas for receiving the transponder response signal. Differences in time, phase, and angle of arrival of the transponder response signal at the separate antennas may be utilized to determine a relative bearing and orientation of the target vehicle 42 with respect to the host vehicle 40. An electronically-scanned, phased-array type radar antenna may inherently have the capability to accomplish the signal comparison as described. The interrogation signal may be a different frequency and/or different waveform than the RF signal utilized for the normal radar scan mode.

Figure 7:
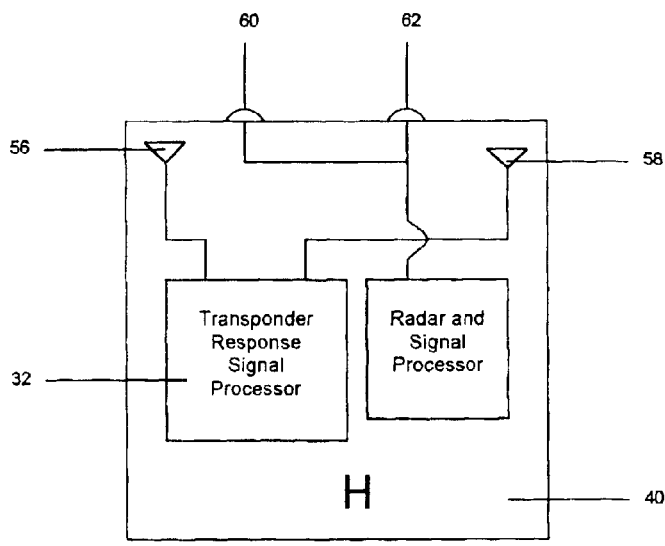
FIG. 7 is schematic view of a host vehicle having separate radar antennas and transponder receive antennas.

To minimize system cost and complexity, the interrogation signal is preferably generated and transmitted using as much as possible of the hardware utilized for the scanning mode of radar operation. If desired, however, the system may feature separate antennas, transmitters, and/or other components for transmitting the two types of signals. As depicted schematically in FIG. 7, the host vehicle 40 is equipped with two transponder receive antennas 56,58 spaced apart from one another on the vehicle, along with two radar transmit/receive antennas 60,62 in order to provide a wider azimuth scan pattern.

Placing the transponder receive antennas 56,58 at widely spaced locations on the host vehicle 40 allows for the maximum amount of differentiation to be achieved between the time and angle of arrival of one or more transponder response signals. The signals received by the two transponder receive antennas are routed to the transponder response signal processor 32, which utilizes the signal parameter differences referred to above to determine the bearing and/or orientation of the target vehicle 42 relative to the host vehicle 40. As in the previously described embodiments, the information from the radar signal is integrated or combined with the information embedded in the transponder response signal to determine a probability of collision.

An advantage of the invention system is that the safety of both the host vehicle 40 and the target vehicle 42 is increased even though the target vehicle is not equipped with the radar/transponder interrogator system 10. A vehicle owner choosing to install an active transponder on his/her vehicle, but not a radar system, receives substantial safety benefit as a result of the information shared with other host vehicles that are equipped with a radar/transponder interrogation system according to the present disclosure. In many cases, mutually beneficial collision mitigation actions taken by the host vehicle 40, such as braking and bumper height adjustment, will benefit the target vehicle 42 as well as the host vehicle. A vehicle owner who chooses to install both an active transponder and a radar/transponder interrogator receives a higher safety benefit, although at greater cost, because his/her vehicle can detect other threat vehicles, as well as identify itself when cued by other radar-equipped vehicles.

The information embedded in the transponder response signal can be used in a great variety of ways by the invention system. For example, information embedded in the signal which describes the physical envelope and orientation of the target vehicle 42 allows the system 10 to precisely calculate the angle of impact between the two vehicles and the point on the target vehicle 42 which will contact the host vehicle 40. Pre-crash system actuation such as airbag inflation and vehicle bumper height alteration may be dependent upon the exact geometry of the impact between the two vehicles. For example, if the TACP 24 is able to determine that the target vehicle 42 will strike the side of the host vehicle 40 or strike at an angle more closely aligned with the lateral axis of the host vehicle 40 than the longitudinal axis, inflatable restraints which protect against longitudinal impact/deceleration may be inflated less forcefully while restraints that protect against lateral impact/deceleration may be inflated more forcefully to provide the required amount of restraint.

In another possible feature of the invention, the target vehicle 42 may be equipped with a system that alerts the driver or affects one or more vehicle systems when an interrogation signal is received by the transponder. For example, a visual, audible or tactile alerting signal may be generated to warn the driver of the target vehicle 42 that the host vehicle 40 has detected the target vehicle and determined that a collision between the two vehicle is possible, as indicated by receipt of the transponder interrogation signal. In another variation, the host vehicle 40 may, after receiving the transponder response signal and calculating the degree of threat of the target vehicle 42, transmit a second signal toward the target vehicle 42. The second signal is a warning signal that may carry information regarding the likelihood and nature of the impending collision. This information may be used by a system aboard the target vehicle 42 to alert the vehicle and/or activate counter measures aboard the target vehicle 42.

What is claimed is:

1. A system for avoiding or mitigating a collision between a host automotive vehicle and a target automotive vehicle, the system comprising:

a radar system mountable on the host vehicle and operative to scan a sector of the target vehicle's environment, detect the target vehicle, and generate target information describing the target vehicle;

a computer operative to determine a probability of collision between the host vehicle and the target vehicle based upon the target information received from the radar system, and to cause the radar system to transmit a directional interrogation signal toward the target vehicle if the probability of collision is sufficiently high; and at least one transponder mountable on the target vehicle and operative to receive the interrogation signal and transmit a response signal containing information indicating dynamic and/or static characteristics of the target vehicle, the computer further operative to receive the information from the response signal and utilize the information to determine an appropriate change in performance of at least one system of the host vehicle in order to avoid or mitigate the consequences of the collision.

2. The system according to claim 1 wherein the radar system comprises an electronically scanned antenna.

3. The system according to claim 1 wherein the at least one transponder comprises a first transponder operative to transmit a first response signal and a second transponder operative to transmit a second response signal, and the computer is able to distinguish between the first and second response signals and thereby determine an orientation of the threat vehicle relative to the host vehicle.

4. The system according to claim 3 wherein the computer determines the orientation by comparing at least one of the following characteristics of the first and second response signals: time of arrival, angle of arrival, phase shift.

5. The system according to claim 1 wherein the information contained in the response signal indicates a relative bearing of the host vehicle with respect to the target vehicle.

6. The system according to claim 5 wherein the response signal comprises a reference phase signal radiating in all directions from the target vehicle and a variable phase signal rotating through 360 degrees, whereby the reference phase signal and the variable phase signal are in phase when the variable phase signal passes a reference bearing of the target vehicle, and the reference phase signal and the variable phase signal are out of phase by an amount equal to an angle between the variable phase signal and the reference bearing.

7. The system according to claim 1 wherein the radar system comprises at least two antennas mountable at different positions on the host vehicle, whereby differences in the response signal as received at the two antennas allow the computer to determine an orientation of the threat vehicle relative to the host vehicle.

8. The system according to claim 1 wherein the information contained in the response signal indicates at least one physical dimension of the target vehicle.

9. The system according to claim 1 wherein the change in performance of at least one system comprises a change in a height of a bumper of the host vehicle.

10. The system according to claim 1 wherein the computer determines a dynamic state of the target vehicle by combining the target information from the radar with the information contained in the response signal.

11. The system according to claim 1 wherein the computer is further operative to generate a warning signal which is transmitted to the target vehicle if the probability of collision is sufficiently high, and further comprising a warning receiver mountable on the target vehicle to receive the warning signal.

12. A system for avoiding or mitigating a collision between a host automotive vehicle and a target automotive vehicle, the system including a radar device mountable on the host vehicle and operative to detect the target vehicle, and a computer operative to determine a probability of collision between the host vehicle and the target vehicle, the system characterized in that: the computer is further operative to a. cause the transmitter to transmit a directional interrogation signal toward the target vehicle if the probability of collision is sufficiently high;

b. extract information from a response signal transmitted by at least one transponder carried by the target vehicle in response to the interrogation signal, the response signal information indicating dynamic and/or static characteristics of the target vehicle; and c. based at least in part upon the response signal information, command at least one system of the host vehicle to alter its performance in order to avoid or mitigate the consequences of the collision.

13. A method of mitigating a collision between a host automotive vehicle equipped with a radar device and a target automotive vehicle equipped with a transponder, the method comprising:

operating the radar device to detect the target vehicle and generate target track information;

based upon the target track information, determining that the target vehicle is a potential threat to collide with the host vehicle;

transmitting a directional interrogation signal from the host vehicle toward the target vehicle;

transmitting a response signal from the transponder in response to receipt of the interrogation signal, the response signal containing information indicating at least one of the following: a dynamic state of the target vehicle and a physical characteristic of the target vehicle;

receiving the response signal on board the host vehicle and extracting the information therefrom; and based at least in part upon the information contained in the response signal, altering performance of at least one system of the host vehicle in order to avoid or mitigate the consequences of the collision.

14. The method according to claim 13 wherein the interrogation signal is transmitted by the radar device.

15. The method according to claim 13 wherein the interrogation signal is transmitted by an electronically scanned antenna.

16. The method according to claim 13 wherein a suspension height of the host vehicle is altered.

17. The method according to claim 13 wherein the target information from the radar is combined with the information contained in the response signal to determine a dynamic state of the target vehicle.

\* \* \* \* \*